US008239908B2

(12) United States Patent
Sofos et al.

(10) Patent No.: US 8,239,908 B2
(45) Date of Patent: Aug. 7, 2012

(54) SYSTEM AND METHOD FOR VERIFYING A CONDITIONAL ACCESS BLACKOUT IN A VIDEO DATA DISTRIBUTION SYSTEM

(75) Inventors: James T. Sofos, Aurora, IL (US); Lee M. Chow, Naperville, IL (US); David J. Piepenbrink, Chicago, IL (US)

(73) Assignee: AT&T IP I, LP, Atlanta, GA (US)

( * ) Notice: Subject to any disclaimer, the term of this patent is extended or adjusted under 35 U.S.C. 154(b) by 909 days.

(21) Appl. No.: 12/271,964

(22) Filed: Nov. 17, 2008

(65) Prior Publication Data

US 2010/0125866 A1    May 20, 2010

(51) Int. Cl.
*H04N 7/173* (2011.01)

(52) U.S. Cl. ........... 725/116; 725/9; 725/14; 725/15; 725/16; 725/17; 725/19; 725/20; 725/25; 725/27; 725/28; 725/29; 725/31; 725/32; 725/34; 725/36; 725/93; 725/146

(58) Field of Classification Search ......... 725/9, 14–17, 725/19–20, 25, 27–29, 31–32, 34–36, 93, 725/116, 146

See application file for complete search history.

(56) References Cited

U.S. PATENT DOCUMENTS

| 5,036,537 A * | 7/1991 | Jeffers et al. ............. 380/241 |
| 7,370,343 B1 * | 5/2008 | Ellis ..................... 725/58 |
| 8,011,012 B2 * | 8/2011 | Carle et al. .............. 726/27 |
| 2003/0126594 A1 * | 7/2003 | Tsuria et al. ............. 725/25 |
| 2005/0251843 A1 * | 11/2005 | Walker .................... 725/117 |
| 2007/0044133 A1 * | 2/2007 | Hodecker ................. 725/117 |
| 2007/0226765 A1 * | 9/2007 | Bahnck et al. ............ 725/63 |
| 2008/0066095 A1 * | 3/2008 | Reinoso .................. 725/28 |
| 2008/0168487 A1 | 7/2008 | Chow et al. |
| 2009/0187938 A1 * | 7/2009 | De Heer et al. ........... 725/34 |
| 2010/0083301 A1 * | 4/2010 | Swenson ................. 725/28 |

* cited by examiner

*Primary Examiner* — Jason Salce
(74) *Attorney, Agent, or Firm* — G. Michael Roebuck

(57) ABSTRACT

A system is disclosed for verifying an occurrence of a blackout event in a data distribution system, the system including but not limited to a processor in data communication with a computer readable medium; and computer program comprising instructions to receive restricted content data at the data distribution system; instructions to receive at the data distribution system, blackout event data indicating at least one criterion for selecting client devices subject to a blackout event for the restricted content data; instructions to place at the data distribution system, client devices into a client device group subject to the blackout event in accordance with the event data criterion; and instructions to correlate at the data distribution system, the blackout event data with the retune activity data to verify the occurrence of the blackout event in the client devices.

12 Claims, 13 Drawing Sheets

| Version = 4 | | | | | | | | | |
|---|---|---|---|---|---|---|---|---|---|
| | Start Time = 07:00 | GRC Set No. = 4 | Signature = 123456 | | | | | | |
| | Collection of Services / Virtual Channels | | | | | | | | |
| GRC/VC | SPN1 | SPN2 | SPNa | SPNb | SPNc | SPNd | SPNe | SPNjpeg | |
| 0 | SPN1 | SPN2 | SPNa | SPNb | SPNc | SPNd | SPNe | SPNjpeg | |
| 1 | SPN1 | SPNc | SPNa | SPNb | SPNc | SPNd | SPNe | SPNjpeg | |
| 2 | SPN1 | SPN2 | SPNa | SPNb | SPNc | SPNd | SPNe | SPNjpeg | |
| 3 | SPN1 | SPN2 | SPNa | SPNb | SPNc | SPNd | SPNe | SPNjpeg | |
| ... | ... | ... | ... | ... | ... | ... | ... | ... | |
| 255 | SPN1 | SPN2 | SPNa | SPNb | SPNc | SPNd | SPNe | SPNjpeg | |

Grouping / Geography

FIG. 4

SYSTEM AND METHOD FOR VERIFYING A CONDITIONAL ACCESS BLACKOUT IN A VIDEO DATA DISTRIBUTION SYSTEM

CROSS-REFERENCE RELATIONSHIPS

This application is related to co-pending applications U.S. Ser. No. 12/271,974 and U.S. Ser. No. 12/271,981 both of which were filed the same day as the present application, Nov. 17, 2008.

BACKGROUND

1. Field of Disclosure

The disclosure relates to the field of video data distribution systems and more specifically to systems and methods for providing verification of software-based conditional access to content.

2. Description of Related Art

Content providers deliver content via broadcasts to a number of users and/or deliver content via on-demand processing based on requests received and content availability. Content providers who have not negotiated broadcast rights for specific programming in certain geographical regions are obligated to restrict access or blackout the content in particular geographical areas. Content providers commonly provide alternative or substituted content that may be shown in areas where the primary content has been blacked out. A content provider typically encrypts and multiplexes the primary and alternative content in channels for transmission to various cable head ends. These signals are de-multiplexed and transmitted to integrated receiver decoders (IRDs) which decrypt the content.

In some conventional systems, a control stream indicates which virtual channels are broadcast to different geographic areas. There is typically one IRD per channel (or group of similar channels) for each geographic area. The content providers typically have a mapping of the unique identifier of each IRD within the service provider's network to the serving area for each of the IRDs. The content provider creates virtual networks or groups of IRDs based on the IRD serving areas. The IRDs decrypt the signals and prepare the output streams, while simultaneously using the virtual network and virtual channel indicators in the control stream to distribute the output stream. In some typical systems, during a blackout, the IRDs switch from one virtual channel to another based on retune messages from the content provider. This causes a simultaneous substitution of content on a specific channel. Note that each cable head end is statically assigned to serve a geographic region, with the IRDs dedicated to each cable head end.

In many conventional systems, blackout areas are defined on a channel by channel basis, and are also defined by specifying a particular IRD. Thus customers served with content that is received by the IRD will receive alternative or substituted content.

BRIEF DESCRIPTION OF THE DRAWINGS

For detailed understanding of the illustrative embodiment, references should be made to the following detailed description of an illustrative embodiment, taken in conjunction with the accompanying drawings, in which like elements have been given like numerals.

FIG. 4 is an illustration of a data structure containing data indicating substitution retuning for a blackout event;

DETAILED DESCRIPTION OF THE DISCLOSURE

Figure 1:
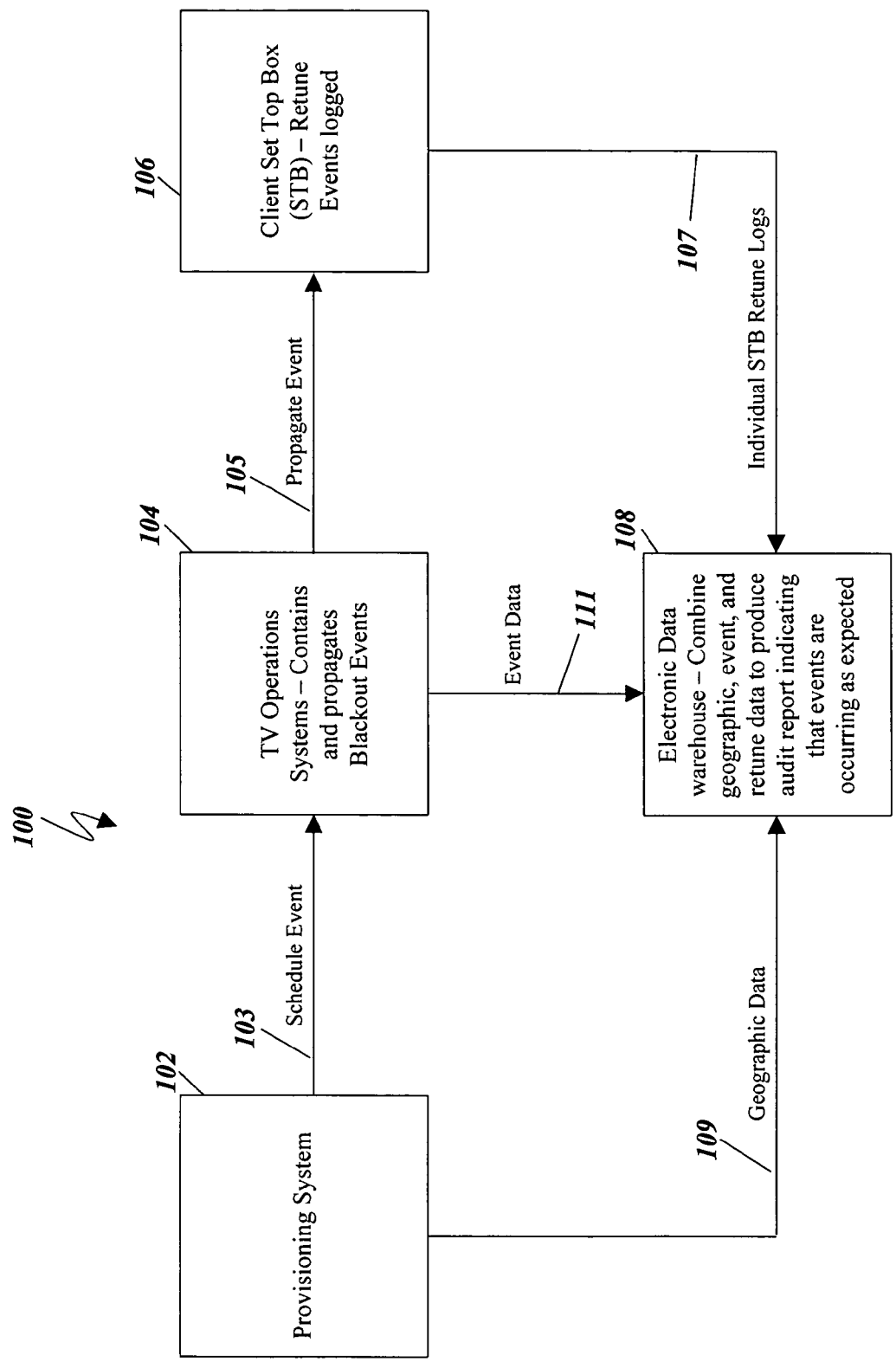
FIG. 1 is a data flow diagram showing an illustrative embodiment of data exchanged and process in a particular illustrative embodiment.

In the following description, for purposes of explanation, numerous specific details are set forth in order to provide a thorough understanding of an embodiment of the present invention. It will be evident, however, to one skilled in the art that the present invention may be practiced without these specific details. This disclosure describes a process to link data logged to a video client (set top box) during a blackout retune event with data logged on the server side and data logged in a provisioning system for the purpose of verifying proper execution of the blackout event for set top boxes located in various geographic locations.

For an Internet Protocol Television (IPTV) system, a software-based blackout system is a novel approach to selectively providing alternate programming in the place of default services for certain geographies based upon content providers' demands. In order to prove to the content providers that the blackout events are having the desired outcome at the client's set top box, a process is provided to analyze reported retune data collected on the set top boxes and map the retune data to event data about the events themselves stored within an electronic data warehouse having mass computer readable medium storage for the data. The client device retune data, in this case an STB retune data, that are logged occur at the time of retune, combining these data with the data stored about the event and the restriction data from the provisioning system can be used to verify that the appropriate service appeared at the time the blackout event was in force.

In an illustrative embodiment, verification of retune data correlated with black out event data is provided to prove that a blackout event has occurred at a given set top box. In illustrative embodiment, retune data collected at the client device in a data distribution network such as an STB. The retune data includes the service switched to and the service switched from along the time of switching. This reported STB retune data is correlated with the collection of related services available for switching during an event (referred to as the substitution collection data) as well as the substitution table version and time and date information with server side data about blackout events to derive an overall snapshot of an outcome of a blackout event. Using account information about the geographic location of the set top box, and the data from the server about the overall blackout event, such as when the blackout started and end in the geographic region, the specific behaviors of a group of STBs in a region subject to a blackout during an event can be determined and matched to the configured specifics of the blackout event.

In another particular embodiment, a computer readable medium is disclosed containing instructions that when executed by a computer perform for verifying an occurrence of a blackout event in a data distribution system, the computer program including but not limited to instructions to receive restricted content data at the data distribution system; instructions to receive at the data distribution system, blackout event data indicating at least one event criterion data for selecting client devices subject to the blackout event for the restricted content data; instructions to place at the data distribution system, client devices into a client device group subject to the blackout event in accordance with the event criterion data; instructions to correlate at the data distribution system, the event criterion data with the restricted content data; generating at the data distribution system, at least one substitution event data table from the correlating for the client device group; instructions to send from the data distribution system, restricted content and the substitution event data embedded in the restricted content data to each client device in the client device group; instructions to receive at the data distribution system, retune activity data from at least one of the client devices in the client device group; and correlating at the data distribution system, the blackout event data with the retune activity data to verify the occurrence of the blackout event in the client devices.

In another embodiment of the medium, in the computer program, the instructions to correlate further include but are not limited to instructions to compare time of day data for the retune activity data for the client devices in the client device group to time of day for the blackout event data to verify that the retune activity data coincides with the blackout event data. In another embodiment of the medium, in the computer program, the restricted data is restricted based on at least one criterion selected from the group consisting of geographic restriction criterion data and demographic restriction criterion data. In another embodiment of the medium, in the computer program, the restricted data is selected from the group consisting of video data and audio data. In another embodiment of the medium, in the computer program, the data distribution system is an internet protocol television system, wherein the verifying further includes but is not limited to instruction to verify the occurrence of the blackout event in an electronic data warehouse for the internet protocol television system.

In another embodiment of the medium, in the computer program, the restricted data is received in a video operations system in the internet protocol television system, the event data is generated in a provisioning system in the internet protocol television system and the retune data is received at the electronic data warehouse. In another embodiment of the medium, in the computer program, the blackout data indicates a retune location to which a client device retunes after initially tuning to a data feed containing the restricted data during the blackout event.

In another embodiment a computer readable medium is disclosed containing instructions that when executed by a computer perform a computer program for reporting retune data for verifying an occurrence of a blackout event in a data distribution system, the computer program including but not limited to instructions to receive at a client device in the data distribution system, restricted content data and substitution event data embedded in the restricted content data; and instructions to send to a server in the data distribution system, client device retune activity data from the client device for correlating at the data distribution system, the blackout event data with the retune activity data to verify the occurrence of the blackout event at the client device. In another embodiment of the medium, in the computer program, the instructions to correlate further include but are not limited to comparing time of day data for the retune activity data for the client device in the to time of day for the blackout event data to verify that the retune activity data coincides with the blackout event data, wherein the restricted data is restricted based on at least one criterion selected from the group consisting of geographic restriction and demographic restriction and wherein the restricted data is selected from the group consisting of video data and audio data.

In another embodiment of the medium, in the computer program, the data distribution system is an internet protocol television system, wherein the verifying further includes but is not limited to verifying the occurrence of the blackout event in an electronic data warehouse for the internet protocol television system, wherein the restricted data is received in a video operations system in the internet protocol television system, the event data is generated in a provisioning system in the internet protocol television system and the retune data is received at the electronic data warehouse. In another embodiment of the medium, the method further includes but is not limited to retuning at the client device to a retune location indicated in the substitution event data after initially tuning at the client device to a data feed containing the restricted data during a blackout event.

In another illustrative embodiment, a system is disclosed for verifying an occurrence of a blackout event in a data distribution system, the system including but not limited to a processor in data communication with a computer readable medium; and a computer program including but not limited to instructions embedded in the computer readable medium, the computer program further including but not limited to instructions to receive restricted content data at the data distribution system; instructions to receive at the data distribution system, blackout event data indicating at least one criterion for selecting client devices subject to a blackout event for the restricted content data; instructions to place at the data distribution system, client devices into a client device group subject to the blackout event in accordance with the event data criterion; instructions to correlate at the data distribution system, the event data with the restricted content data; instructions to generate at the data distribution system, at least one substitution event data table from the correlating for the client device group; instructions to send from the data distribution system, restricted content and substitution event data embedded in the restricted content data to each client device in the client device group; instructions to receive at the data distribution system, retune activity data from at least one of the client devices in the client device group; and instructions to correlate at the data distribution system, the blackout event data with the retune activity data to verify the occurrence of the blackout event in the client devices.

In another embodiment of the system, the instructions to correlate further comprise instructions to compare time of day data for the retune activity data for the client devices in the client device group to time of day for the blackout event data to verify that the retune activity data coincides with the blackout event data. In another embodiment of the system, the restricted data is restricted based on at least one criterion selected from the group consisting of geographic restriction criterion data and demographic restriction criterion data. In another embodiment of the system, the restricted data is selected from the group consisting of video data and audio data. In another embodiment of the system, the data distribution system is an internet protocol television system, wherein the instructions to verify further comprise instructions to verify the occurrence of the blackout event in an electronic data warehouse for the internet protocol television system.

In another embodiment of the system, the system further includes but is not limited to a video operations system having an interface to receive the restricted data in the internet protocol television system and a provisioning system in the internet protocol television system having an interface to receive the event data and blackout data and send retune data to client devices in the internet protocol television system and an electronic data warehouse having an interface to receive the electronic data warehouse. In another embodiment of the system, the blackout data indicates a retune location to which a client device retunes after initially tuning to a data feed containing the restricted data during the blackout event.

In another illustrative embodiment, a system is disclosed for reporting retune data for verifying an occurrence of a blackout event in a data distribution system, the system including but not limited to a processor in data communication with a computer readable medium; and a computer program including but not limited to instructions embedded in the computer readable medium, the computer program further including but not limited to instructions to receive at a client device in the data distribution system, restricted content data and substitution event data embedded in the restricted content data; and instructions to send to a server in the data distribution system, client device retune activity data from the client device for correlating at the data distribution system, the blackout event data with the retune activity data to verify the occurrence of the blackout event at the client device.

In another embodiment of the system, in the computer program the instructions to correlate further comprise instructions to compare time of day data for the retune activity data for the client device in the to time of day for the blackout event data to verify that the retune activity data coincides with the blackout event data, wherein the restricted data is restricted based on at least one criterion selected from the group consisting of geographic restriction and demographic restriction and wherein the restricted data is selected from the group consisting of video data and audio data. In another embodiment of the system, the data distribution system is an internet protocol television system, wherein the instructions to verify further includes but is not limited to instructions to verify the occurrence of the blackout event in an electronic data warehouse for the internet protocol television system, wherein the restricted data is received in a video operations system in the internet protocol television system, the event data is generated in a provisioning system in the internet protocol television system and the retune data is received at the electronic data warehouse. In another embodiment of the system, the computer program further includes but is not limited to instructions to retune the client device to a retune location indicated in the blackout data after initially tuning the client device to a data feed containing the restricted data during a blackout event.

FIG. 1 illustrates a particular example of data flow that occurs to enable verification and audit of blackout event data for the purpose of determining the client side outcome of scheduled blackout events. Turning now to FIG. 1, in a particular illustrative embodiment, data flow diagram 100 provides for verification of a conditional access event such as a blackout. As shown in block data flow diagram 100, a provisioning system 102, for example a Service Delivery Platform (SDP) sends schedule event data 103 to TV Operations System 104 which contains and propagates Blackout Events data. TV Operations system 104 at a Super Head Office (SHO) in an internet protocol television (IPTV) system and sends or propagates event data 105 to a client device, such as STB 106. The STB 106 logs retune event data in an Individual STB Retune Log and sends the Individual STB Retune Log data 107 to an Electronic Data Warehouse (EDW) 108. Provisioning system 102 (SDP) sends geographic data to the EDW. TV Operations Systems 104 at the SHO sends Event Data 111 such as event start and end time to the EDW. The EDW combines the geographic, event data and retune data to produce an audit report verifying that conditional access black out events occurred as expected, that is, verifying that the retune event occurred as expected at the client device level as requested by a content provider. In another particular embodiment retune events are only logged if a subscriber tunes to the blacked out event or service at the time a blackout event is in force for that subscriber's assigned group.

Figure 2:
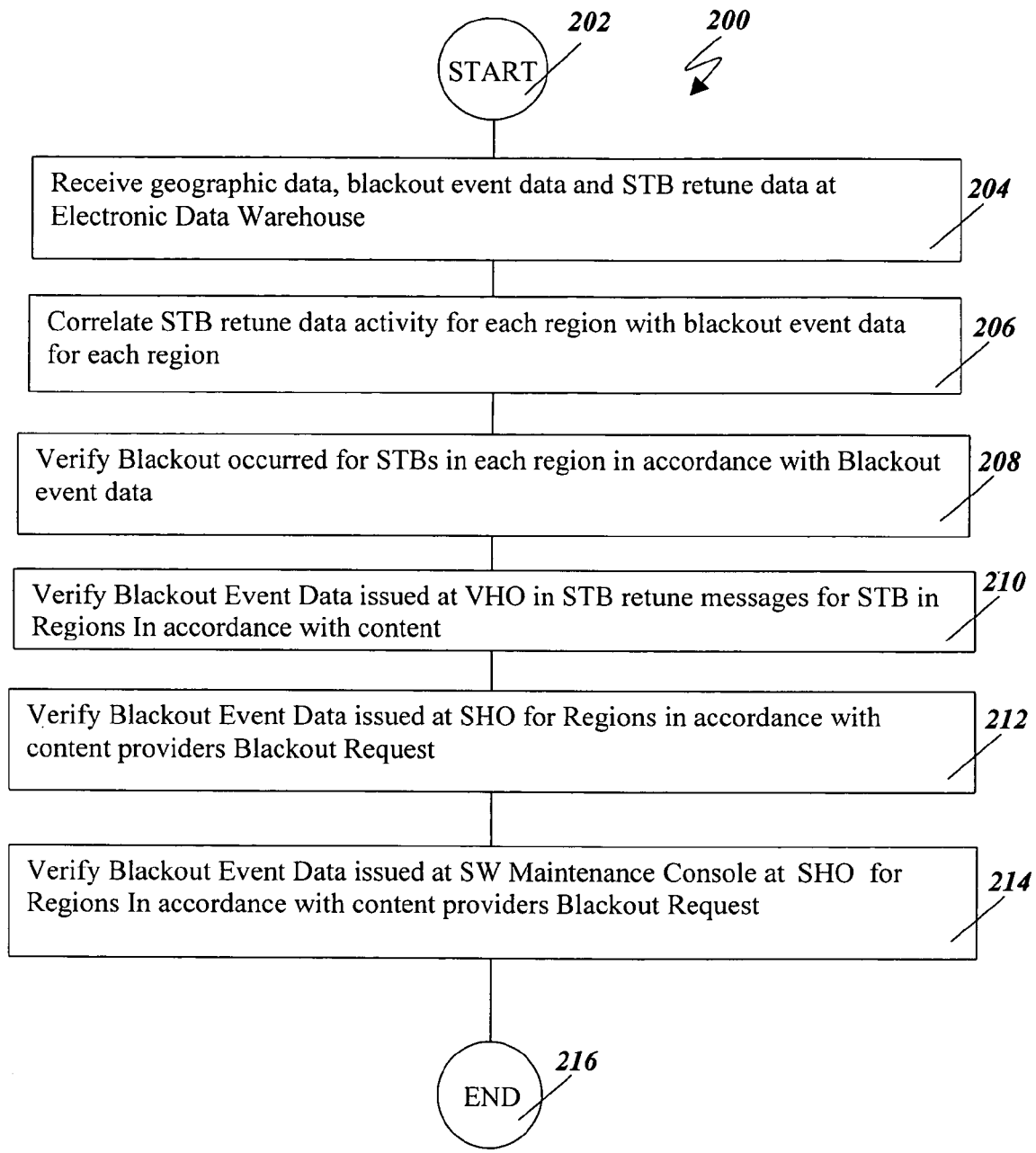
FIG. 2 is a flow chart depicting functions performed in an illustrative embodiment.

Turning now to FIG. 2, a flow chart is depicted for functions performed in an illustrative embodiment. No particular order is dictated by the arrangement of functions shown in FIG. 2. Some of the functions may be excluded from or executed in a different order in other embodiments. In a particular illustrative embodiment, function performance initiates at terminal 202 and proceeds to block 204 in which an EDW receives geographic data; blackout event data and STB retune data, all of which are stored in a mass computer readable media at the EDW. At block 206 an EDW processor at the EDW correlates the STB retune data with blackout event data for each geographic region. At block 208 the EDW processor then verifies that the blackout occurred for STBs in each geographic region in accordance with the blackout event data for each geographic region. In another particular embodiment, STB can be subject to black out based on another criterion, such as a demographic restriction. For example, all STBs associated with subscribers in a particular demographic group, such as income over $100,000.00 will be shown a primary video feed on channel 1 and all STBs all STBs associated with subscribers in another particular demographic group, such as income under $100,000.00 will be retuned under the black out data to a secondary video feed on channel 2 during a particular financially oriented program.

Returning to the geographic blackout example of FIG. 2, at block 210 the EDW processor then verifies the blackout event data issued at the SHO. The SHO event data is sent in STB retune messages sent to STBs in geographic regions where content providers have requested a blackout event. For example, the DALLAS COWBOYS™ football game may be blacked out in Dallas, Tex. when the game is not sold out within 72 hours before kickoff, according to a request by a content provider (i.e., the National Football League). In this case, STBs associated with viewers in Dallas would receive retune instructions in the form of substitution event table data. The substitution event table data are embedded in the content from the NFL. The substitution event table defines alternate events for STBs in the Dallas geographic region during the Cowboys game and instructs the STBs in the Dallas geographic region to retune to another video data feed during the Dallas Cowboys football game. Thus, when viewers in Dallas tune to the Dallas game, STBs associated with the Dallas viewers are retuned to another football game, such as the OAKLAND RAIDERS™ football game on an alternate video stream on the same channel or tuner position. The retuning activity during the Dallas game is logged at the STBs associated with the Dallas viewers. A special code is used indicating that the retuning occurred in accordance with the substitution event table to differentiate the retuning activity from voluntary retuning such as channel surfing by the viewer.

At block 212 the EDW verifies blackout event data issued at the SHO for regions in which content providers have requested a blackout event. For example, client STBS associated with the viewers in Dallas would receive retune message data, including but not limited to the substitution event table data, in video content data received when the viewers tuned their STBs during the DALLAS COWBOYS game to the IPTV channel on which the DALLAS COWBOYS™ game is scheduled to be presented. STBs associated with these viewers store STB retune data with a code indicating that the STB retune was associated with black out event data and occurred at a particular time. STB retune activity initiated by the viewer, such as channel surfing or other voluntary changing channels or video streams are coded with a different identifier than retune data associated with a blackout event. Thus, the option is presented to report all STB retune data or only STB retune data associated with a blackout event upstream to the EDW.

STBs report retune activity data (also referred to herein as "retune data") to the EDW to indicate what retuning activity (changing channels or video streams activity) viewers performed when presented with retune message data during the DALLAS COWBOYS™ game. The EDW receives the retune activity data from the STBs. The retune activity data is correlated or compared with the blackout event data for the Dallas region to verify that STBs tuned during the COWBOYS game to the video channel on which the DALLAS COWBOYS game was presented retuned to another video stream or video feed on the same channel or same tuner position to view alternate programming. At block 214 the EDW processor verifies the occurrence of the blackout event at the client device level for regions in which content providers have requested a blackout event. In a particular illustrative embodiment the process ends at terminal 216.

Figure 3:
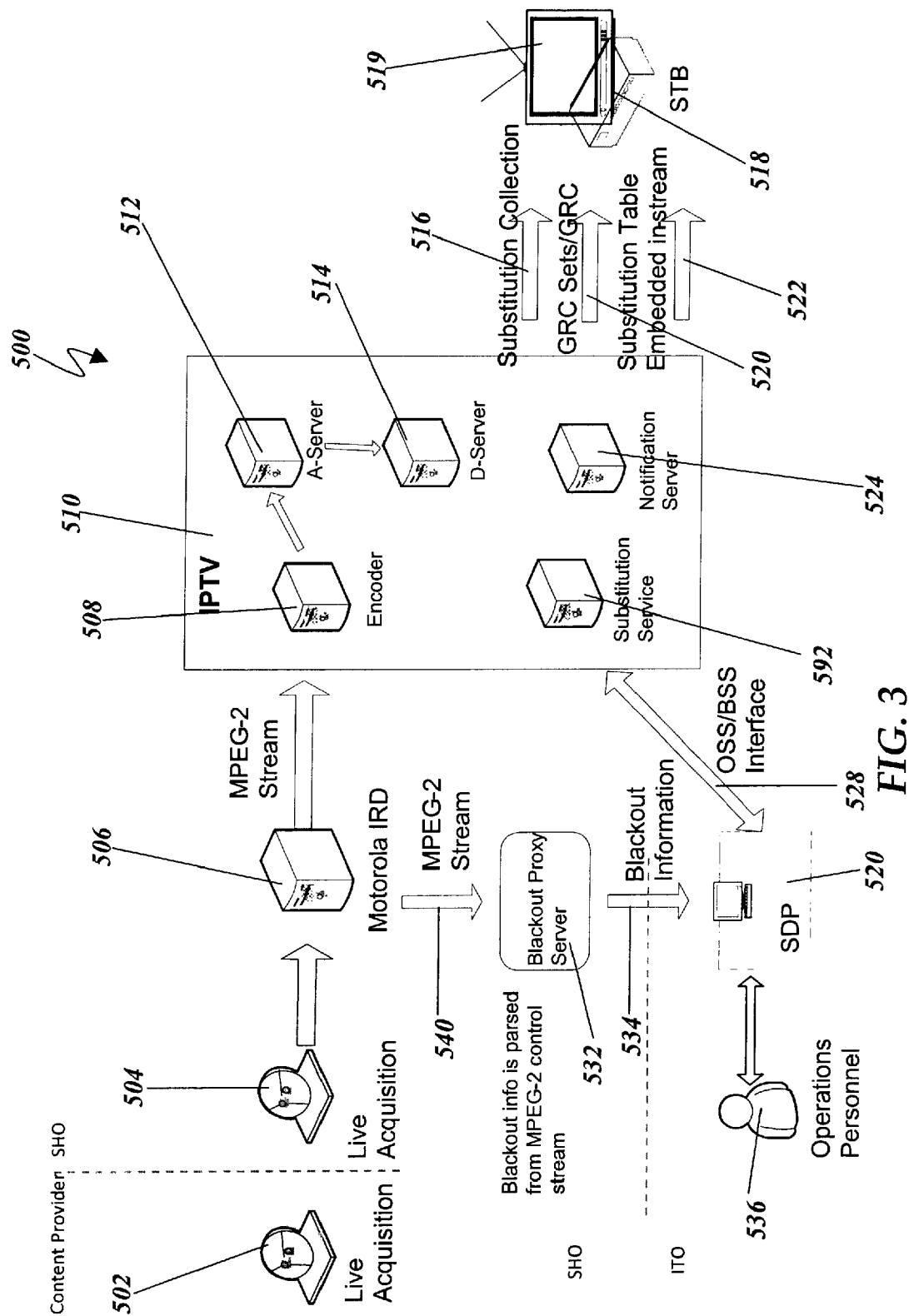
FIG. 3 is overview schematic depiction of an architectural diagram of a particular illustrative embodiment.

Turning now to FIG. 3, an architectural overview is depicted in FIG. 3. In particular illustrative embodiment, acquisition services 544 comprises a content provider 302 that provides live data from acquisition of video data at a live event such as a foot ball game. The content provider passes the live acquisition video data to a live 20 acquisition element 304 at a SHO in an IPTV system 540. The SHO passes the live video data received from the content provider to an integrated receiver/decoder (IRD) 306. The IRD encodes the live video data in an MPEG-2 video data stream and sends the MPEG-2 video data stream to a down stream IPTV server encoder 308 in an IPTV system node such as a VHO and to a blackout proxy server 310 in video operations 510.

The blackout proxy server parses blackout event information from the MPEG-2 video data stream. The blackout proxy server sends the blackout event data to the SDP 530. Operations personnel or a processor at the SDP analyzes the event data and creates geographic restriction codes (GRCs) defining geographic regions for viewers, GRC sets for different content providers and substitution collection data defining what services or feeds can be substituted for the event in each region. The SDP sends the blackout data including but not limited to substitution collection data, GRC sets/GRC data and substitution event table data to the IPTV system. The IPTV system then sends the black out data to appropriate STBS. The IPTV system encodes the blackout information into the video data stream for those STBs which are in geographic areas subject to the blackout.

In another embodiment, STBs subject to the blackout are selected upon criteria different than geographic location criteria, such as demographics criteria. The substitution service forms a substitution event table and embeds the substitution event table data in content sent to the STBs. The substitution table data are embedded in the video data stream and sent to the STBs. Each STB stores retune activity data in retune data logs which are collected by the IPTV system during substitution collection. The retune event data logs are sent upstream to the EDW where the EDW processor correlates the retune log data with blackout events in each region for each event subject to a blackout.

Turning now to FIG. 4, a substitution event table data structure 400 containing data embedded in a computer readable medium is illustrated. The substitution table data structure is generated and populated with blackout event data in a particular illustrative embodiment. The substitution event data embedded in the substitution event table data structure illustrated in FIG. 4 are sent to each STB in content data during a blackout event. Restricted content is available for viewing at client devices meeting a certain criterion, including but not limited to geography criterion data and demographic criterion data. The substitution event table data are embedded into the restricted content data sent to the STBs. In the current example, as shown in FIG. 4, an STB in a Grouping/Geography/GRC 1 which is subject to a scheduled black out event is retuned to SPNc when tuning to geographically restricted content data on SPN2. As shown in FIG. 4, services provided on IPTV channels (which do not have to be dedicated channels as channels may vary) are listed in rows of the data structure. In the present example, services SPN1 402, SPN2 406, SPNa 408 and SPNc 410, etc are listed across the rows of the substitution event table. Columns in the substitution event table indicate GRC 404 numbers such as GRC 1 406. In the present example, an STB in GRC 1 will be retuned to SPNc 411 after initially tuning to SPN2. Event description data including but not limited to substitution event table version number 412, event start time 414, GRC set number 416 for a particular content provider and event signature 12346 418. The GRCs define different geographic regions. Different content providers can have different GRC sets and different GRCs. For example, a GRC set can be defined for a provider, such as, a GRC code of 1 can be assigned to Chicago, Ill. and a GRC code of 2 can be assigned to San Antonio for the particular content provider. Another content provider can define a different GRC set having a 1 for Atlanta and a 2 for Los Angeles.

Figure 5:
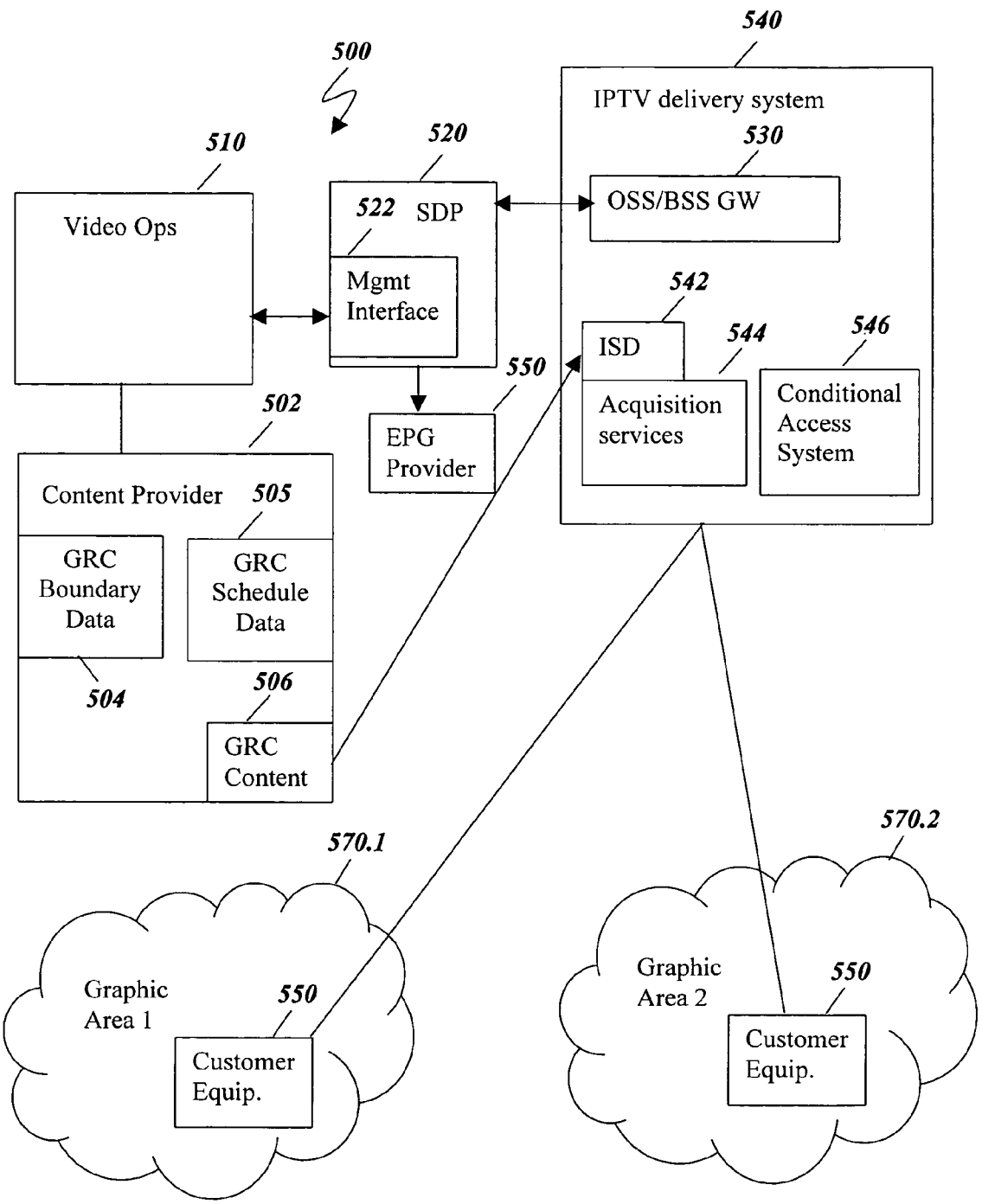
FIG. 5 is a block diagram of a system for geographically restricting content in accordance with an example embodiment.

Referring to FIG. 5, an example embodiment of a system 500 for providing blackouts for geographically restricted content data is illustrated. In a particular illustrative embodiment, the system 500 includes but is not limited to a content provider 502, a video operations unit 510, a service delivery platform (SDP) 520 and IPTV delivery systems 540. Content provider 502 may be any entity that provides content that may need to be geographically restricted. Examples of such content providers include movie or television content providers, sporting event content providers, musical content providers and the like.

In an example embodiment, the content may include media such as video content data in the form of a live sporting event, a special run movie or television program and digital music content such as an MP3 file. In an example embodiment, the content may include data such as a video game and/or patch file. In an example embodiment, the content data may include informational content data. It should be appreciated that other types of content data may be used with the system 500. Content providers 502 may define and maintain Restricted Content (RC) such as geographic boundary data 504 for geographically restricted content and schedule data 506 for the RC. In some embodiments, RC boundary data may be defined in terms of zip codes. For example, 3-digit zip, 5-digit zip, or zip+4 codes may be used. In alternative embodiments, other geographic location mechanisms may be used. For example, the geographical boundaries may be defined in terms of a radius from a center point. The embodiments are not limited to a particular method of defining a geographical boundary.

RC schedule data 506 comprises a list of blackout events and times for the blackout events. Video operations unit 510 receives the RC boundary data 504 and RC schedule data 506 and uses the data to provide content blackout data to SDP 520. SDP 520 may comprise one or more systems involved with service provisioning, including services related to providing geographically restricted content. In some embodiments, SDP 520 includes a management interface 522 that is used to input content blackout data. In some embodiments, management interface 522 is a graphical user interface. In alternative embodiments, management interface may be a communications interface that receives input data directly from one or more systems.

In another particular embodiment, an IPTV system 540 may include various servers and systems involved in the delivery of IPTV services to end users having customer equipment 550 in various geographic areas 570. In some embodiments, IPTV system 540 includes OSS/BSS gateway 530, acquisition services 544, and conditional access module 546. In some embodiments, the OSS/BSS gateway 530 includes operation systems and support (OSS) data, as well as billing systems and support (BSS) data. In one embodiment, the OSS/BSS gateway can provide or restrict access to an OSS/BSS server that stores operations and billing systems data. SDP 520 forwards blackout event data to OSS/BSS gateway 530 of IPTV system 540. OSS/BSS gateway 530 may store the blackout data and/or forward the blackout data to other systems within IPTV system 540, such as conditional access module 546. An example of an IPTV system is depicted in FIG. 4 and discussed below.

Acquisition services 544 includes one or more systems that receive content from content providers. Acquisition services 544 receives the content through one or more IRDs 542 associated with the content provider. In some embodiments, an IRD (main and backup) is provided at the SHO for each content provider (e.g. ESPN). An additional IRD (main and backup) for each alternate channel to support the blackout/market protection requirements of the content provider may be used. It should be noted that only one set of one or more IRDs need be used to provide service on a national basis, and that individual IRDs need not be deployed for individual geographic areas 570.

The content may be organized as channels providing services, where a service is a stream of video content data. A channel may include one or more services or video streams. For example, channel may include a picture-in-picture (PIP) stream and a full screen video stream. A content provider may provide multiple channels, including primary content, secondary content, and one or more channels of substituted content. Primary content is content that may be subject to a blackout event. Secondary content may be content associated with the primary content, such as advertising content related to the primary content. Substituted content is content that may be substituted for the primary content in the event that the primary content is subject to a blackout restriction.

Conditional access module 546 uses the GRC data received by OSS/BSS gateway 530 to determine the content that may be delivered to customer equipment 550 in geographic areas 570.1 and 570.2. As noted above, geographic areas 570.1 and 570.2 may be represented in GRC data as a list of one or more zip codes that are to be included in the geographic area. Conditional access module may be a software component of another IPTV service, or it may be a standalone service within IPTV system 540.

As IPTV system 540 receives requests for content from customer equipment 550, such a client STB, conditional access module 546 determines if the requested content is subject to a blackout for the geographic area where customer equipment 550 exists, based on the GRC data received by OSS/BSS gateway 530. If the requested content is subject to a blackout event based on the blackout schedule and GRC data, conditional access module causes the IPTV system 540 to prevent the requested primary content from being sent to the customer equipment. In this event, IPTV system 540 may be configured to provide an on screen display (OSD) informing the viewer that the primary content data is unavailable, that is, "blacked out." The OSD may provide a list of one or more video streams of substituted content data or JPEG data that may be available. Alternatively, IPTV system 540 may be configured to automatically provide substitute content data to the requesting customer equipment 550.

Customer equipment 550 may be any type of equipment capable of receiving IPTV streams. For example, customer equipment 550 may be an STB or a computer capable of decoding IPTV streams. It will be appreciated from the above that a zip code level of granularity in defining a blackout area may be achieved in some embodiments. For example, geographic area 570.1 may be defined as including only one zip code, and geographic area 570.2 may also be defined as including only one zip code. Primary content may be blacked out in geographic area 570.1 while allowed in geographic area 570.2. In another embodiment, STB, telephone area code or neighborhood granularity may be enforced during a blackout event based on demographic data for viewers associated with individual STBs or STBs in a particular telephone area code or neighborhood. In some embodiments, SDP 520 may also provide blackout event data to an Electronic Program Guide (EPG) provider 580 which provides for the dynamic update of EPG data as blackout events are created, started, and ended.

Figure 6:
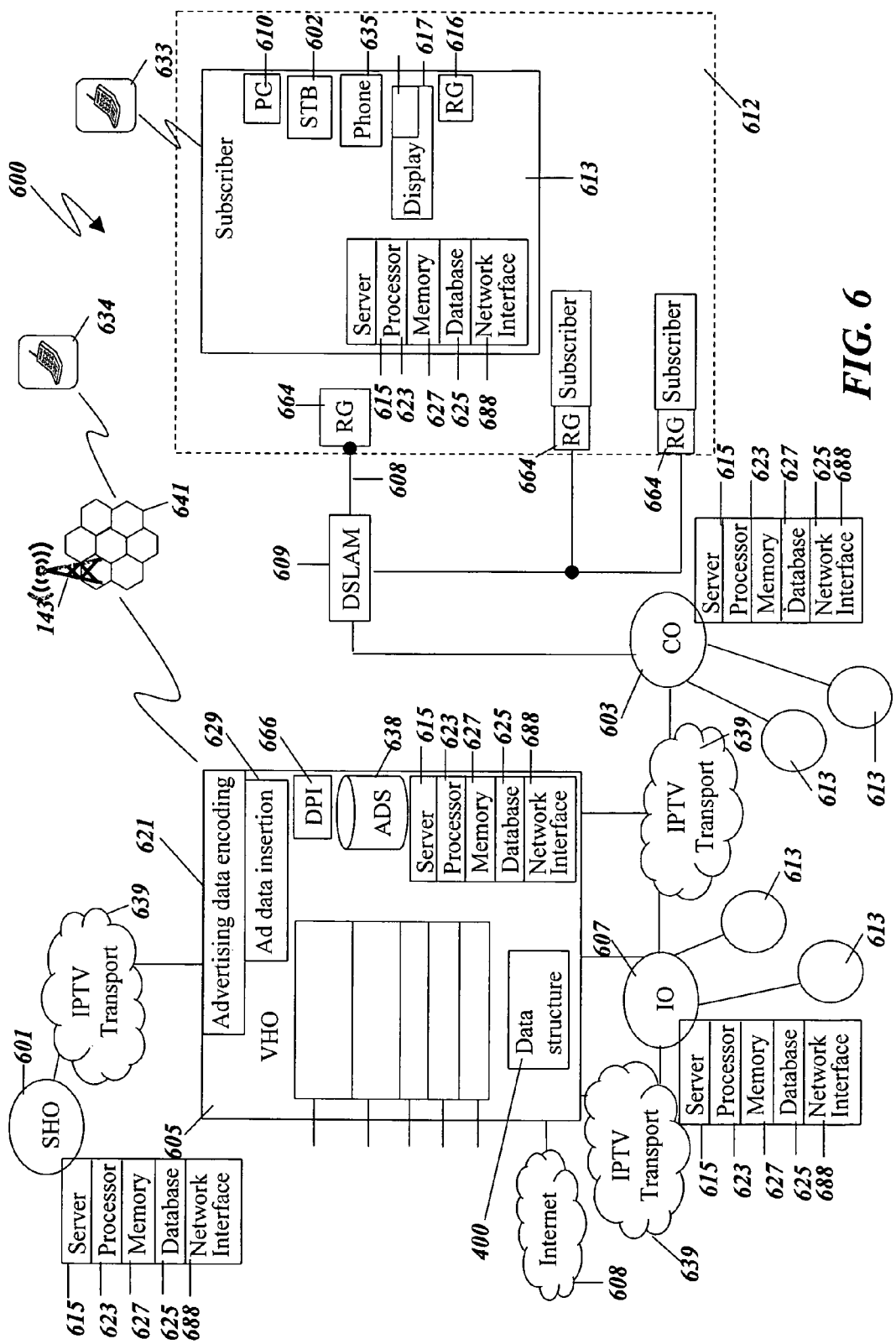
FIG. 6 depicts an illustrative embodiment of an internet protocol television (IPTV) system.

Turning now to FIG. 6, an illustrative embodiment of an IPTV system 540 is depicted. In an illustrative IPTV system, 540 delivers video data including but not limited to video data content and advertising data to subscriber households 613 and associated end user devices (also referred to herein as subscriber or client devices) which may be inside or outside of the household. The video data further includes but is not limited to blackout event data and substitution table data.

In the IPTV system, IPTV channels or video feeds and video streams are first broadcast in an internet protocol (IP) from a server at a super hub office (SHO) 601 to a regional or local IPTV video hub office (VHO) server 603, to an intermediate office (IO) server 607 and to a central office (CO) 603. The IPTV system 600 includes a hierarchically arranged network of servers wherein a particular embodiment the SHO transmits video and advertising data to a video hub office (VHO) 603 and the VHO transmits to an end server location close to a subscriber, such as a CO server 603 or IO 607. In another particular embodiment, each of the SHO, VHO, CO and IO are interconnected with an IPTV transport 639. The IPTV transport 639 may consist of high speed fiber optic cables interconnected with routers for transmission of internet protocol data. The IPTV servers also provide data communication for Internet and VoIP services to subscribers.

Actively viewed IPTV channels data are sent in an Internet protocol (IP) data multicast group to access nodes such as digital subscriber line access multiplexer (DSLAM) 609. A multicast for a particular IPTV channel is joined by the set-top boxes (STBs) at IPTV subscriber homes from the DSLAM. Each SHO, VHO, CO, IO and STB includes a server 615, processor 623, a memory 627, network interface 688 and a database 625. The network interface functions to send and receive data over the IPTV transport. The CO server delivers IPTV, Internet and VoIP content to the subscriber via the IO and DSLAM. The television content is delivered via multicast and television advertising data via unicast or multicast depending on a target television advertising group of end user client subscriber devices to which the advertising data is directed.

In another particular embodiment, client devices, also referred to herein as end user devices, are different stationary and mobile devices, including but not limited to, wire line phones 635, portable phones 633, lap top computers 618, personal computers (PC) 610 and STBs 602, 619 communicate with the communication system, i.e., IPTV system through residential gateway (RG) 664 and high speed communication lines such as IPTV transport 639. In another particular embodiment, DPI devices 666 inspect data VoIP, Internet data and IPTV video, commands and Meta data (multicast and unicast) between the subscriber devices and the IPTV system severs.

In another particular embodiment, the end user devices or subscriber devices include but are not limited to a client user computer, a personal computer (PC) 610, a tablet PC, a set-top box (STB) 602, a Personal Digital Assistant (PDA), a cellular telephone 634, a mobile device 634, a palmtop computer 634, a laptop computer 610, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. In another particular embodiment, a deep packet inspection (DPI) device 624 inspects multicast and unicast data, including but not limited to VoIP data, Internet data and IPTV video, commands and Meta data between the subscriber devices and between subscriber devices and the IPTV system severs.

As shown in FIG. 6 STB groups 612 (comprising a group of subscriber house holds 613) receive multicast advertising data and advertising data keys in video data stream from IO server 607 via CO 603 and DSLAM 609 at STB 602. In another particular embodiment, each STB is configured to perform DVR functionality using memory, processor and data base on board the STB. Individual households 613 receive GRC data and substitution event table data at set top box 602 or one of the other client devices. More than one STB (see STB1 602 and STB2 619) can be located in an individual household 613 and each individual STB can receive a separate multicast or unicast advertising stream on IPTV transport 639 through DSLAM 609. In another particular illustrative embodiment separate and unique advertising data are displayed at each set top box (STB) 602, 619 tailored to target the particular subscriber watching television at that particular STB. Each STB 602,619 has an associated remote control (RC) 616 and video display 617. The subscriber via the RC selects channels for a video data viewing selection (video programs, games, movies, video on demand), initiates trick play commands data to the STB/DVR and places orders for products and services over the IPTV system 600.

Figure 7:
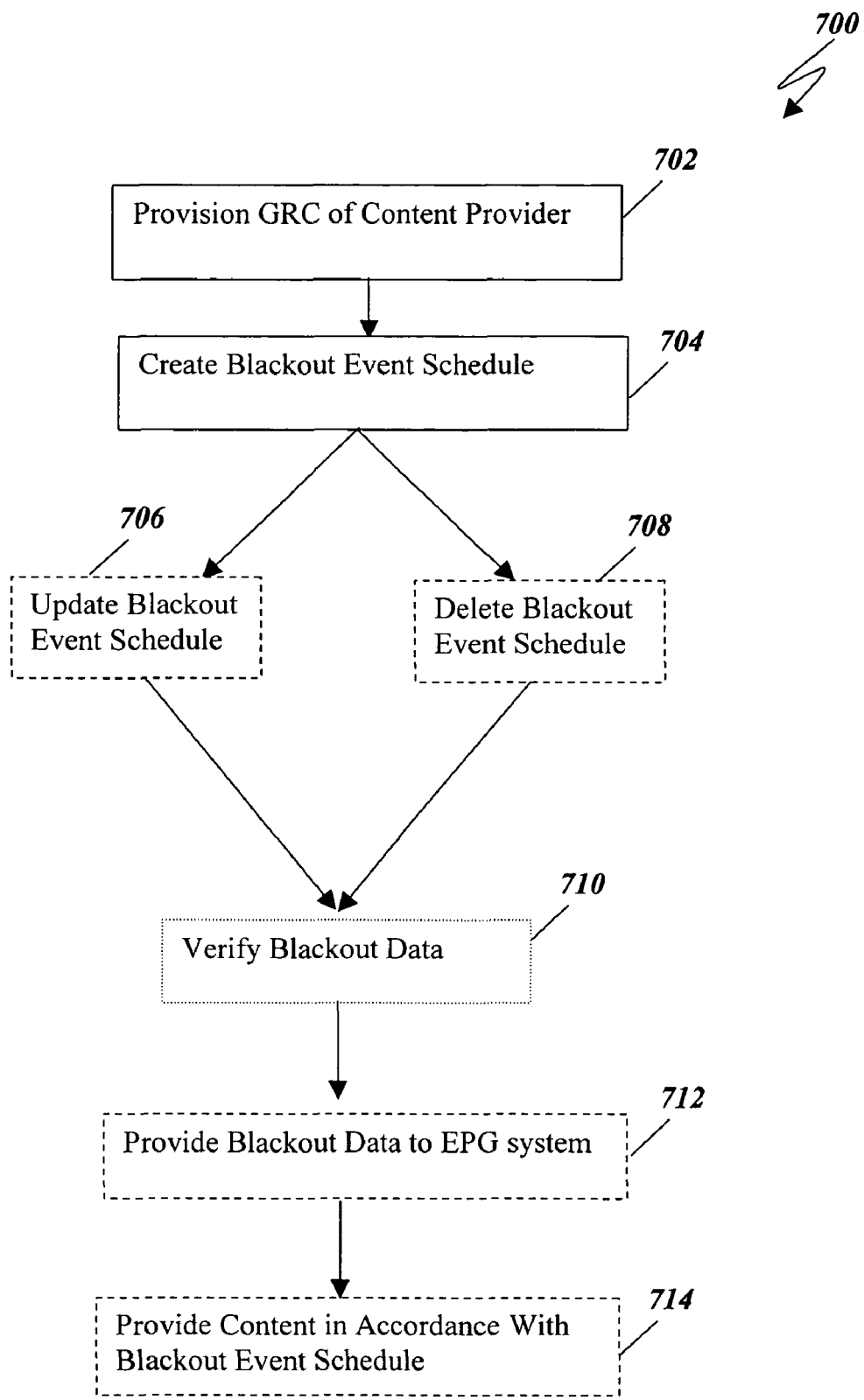
FIG. 7 is a flowchart illustrating a method in accordance with an example embodiment for providing geographically restricted content.

Referring to FIG. 7, a flowchart illustrating a method 700 in accordance with an example embodiment for providing geographically restricted content data is shown. The method begins at block 702 by provisioning geographically restricted content data for a content provider. In another embodiment the GRC data designates groupings of Designated Market Areas (DMAs). In another embodiment the GRC data designates groups of viewer by demographic criteria. In some embodiments, a GRC user interface at the SDP is used to input data regarding geographically restricted content data into a service delivery platform. The data may include boundary data as defined by a content provider. Provisioning GRC data for a content provider may include initializing GRC data in a substitution event table data structure for a content provider or updating GRC data that has been previously entered.

A blackout schedule is created at block 704. The blackout schedule comprises a list of blackout events for a content provider. In some embodiments, SDP 520 reads a list of packages and services for each blackout channel and creates a blackout event and substitution event table data structures describing the blackout event. Further details on creating a blackout schedule are provided by the sequence diagram shown in FIG. 7. Blocks 706 and 708 represent activities that may optionally take place after a GRC provider has been provisioned at block 702. The activities may include updating a previously created blackout schedule (block 706) or deleting a previously created blackout schedule (block 708), thereby removing a blackout event. Further details on blackout event updates and deletes are provided by the sequence diagrams discussed below.

Current blackout event data may optionally be verified at block 710. Operations personnel may use interface 722 to query SDP 520 for the current blackout event data. In some embodiments, SDP 520 obtains the current blackout event data from OSS/BSS gateway 530 and presents the current blackout data to the user. The user may use the data to verify that a blackout event has been correctly created, updated or deleted. Further details on verifying blackout event data is provided by the sequence diagram discussed below. In some embodiments, at block 712, information regarding blackout events that are created, updated or deleted may be sent to an EPG provider. The EPG provider may use the data to dynamically update an EPG that may be provided to IPTV customers.

At block 714, SDP 520 provides primary and alternative (substitute) content for a blacked out event on one or more channels in accordance with the blackout event schedule and geographic boundaries established at blocks 702-708 above. In some embodiments, the channels may include primary content streams and substitution content streams. In some embodiments, the IPTV system ignores control channel and the embedded conditional access event information embedded within the content streams, because the blackout event data received from SDP 520 is used to determine whether content is subject to a particular blackout event. The blackout event data is used to instruct IPTV system 540 client devices to switch the appropriate content streams according to the blackout event data maintained on the SDP.

Figure 8:
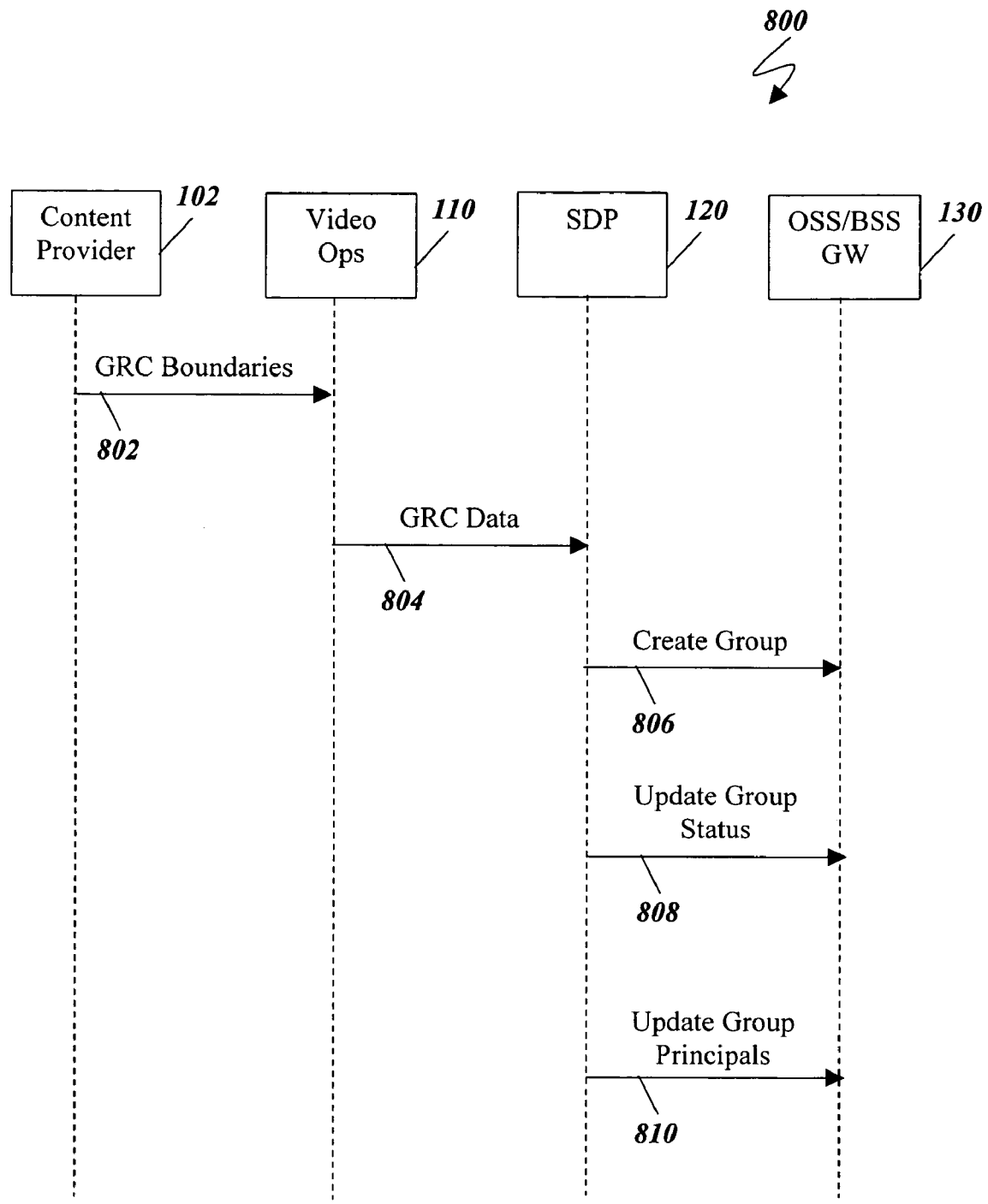
FIG. 8 is a sequence diagram for a method for provisioning geographically restricted content for a content provider in accordance with an example embodiment.

Referring to FIG. 8, a sequence diagram for a method 800 for provisioning geographically restricted content for a content provider in accordance with an example embodiment is shown. In some embodiments, provisioning begins at 802 when a content provider provide list of RC boundaries. As noted above, the boundary data may be based on 3-digit/5-digit zip/zip+4 boundaries or other geographic location mechanisms. At 804, for each content provider, video operation s unit 510 enters the RC data into SDP 520 (either manually or in an automated process). In some embodiments, this data includes may include various combinations of one or more of: RC ID; RC Boundaries (3-digit zip, 5-digit zip, zip+4); Content Provider ID; Optional Team/League Effective and Expiration Date Modification Date/Modification By; Approved By.

At 806, in some embodiments, SDP 520 additionally creates a persistent RC data structure containing normalized values for the RC boundaries. For each content provider's RC, SDP 520 may create a corresponding subscriber group in IPTV client device STBs. A subscriber group is a representation of a geographic boundary, and comprises a set of subscribers within the defined geographic area. In some embodiments, a subscriber group may include one or more of the following: Name of Subscriber Group; Status=Enabled/Disabled; and Type=Blackout. At 808, a status attribute for the subscriber group may be updated. This may be useful for versioned RCs. At 810, a principals list may be updated allowing for the addition and/or removal of accounts/subscribers from subscriber groups. A principal is an account holder that may be responsible for one or more subscribers.

Figure 9:
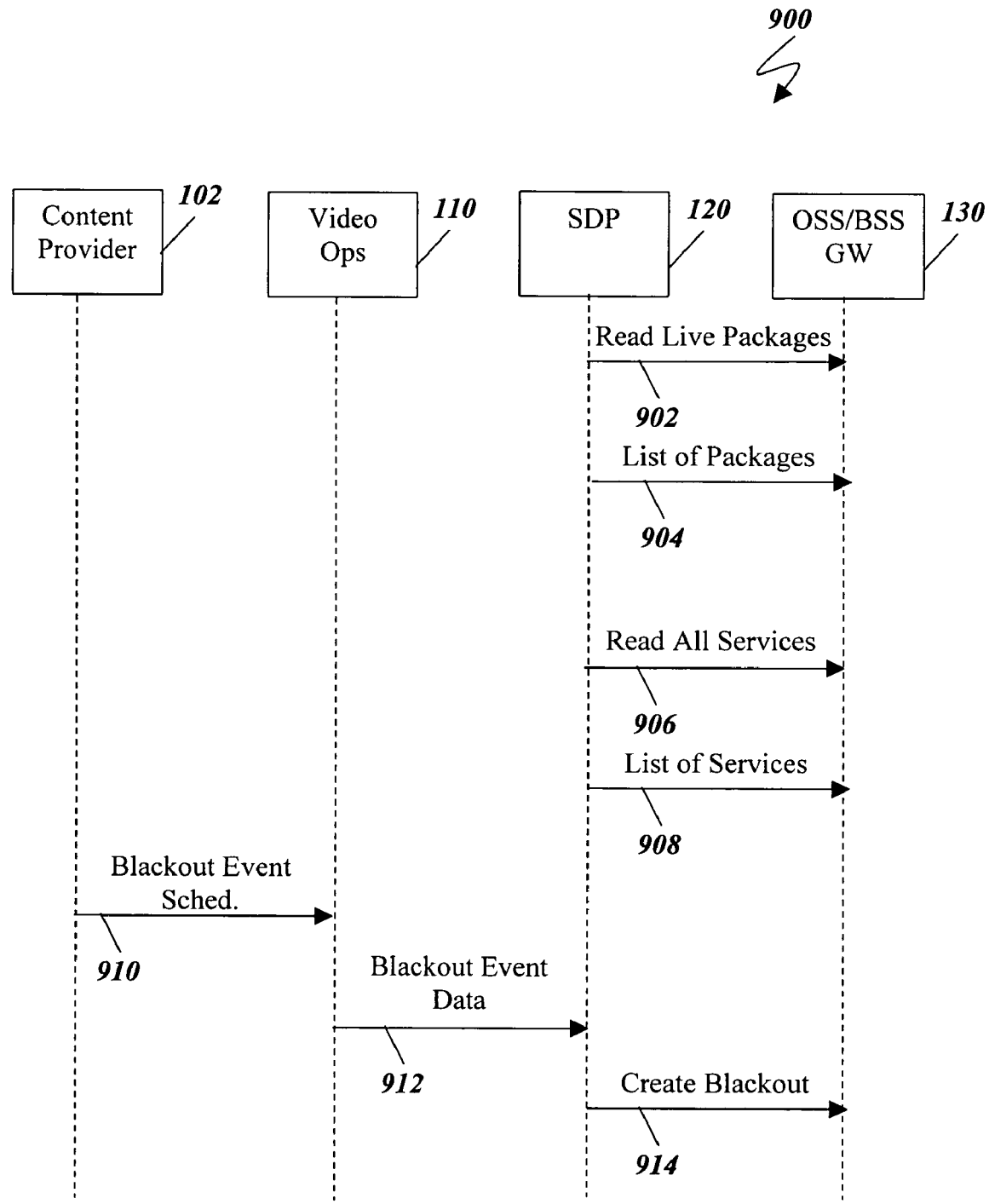
FIG. 9 is a sequence diagram for a method for defining a blackout schedule for geographically restricted content in accordance with an example embodiment.

Referring to FIG. 9, a sequence diagram for a method 900 for defining a blackout schedule for geographically restricted content in accordance with an example embodiment is shown. In some embodiments, SDP 520 discovers blackout service collections and the associated services contained in each service collection for each blackout channel provisioned at IPTV. For example, at 902 SDP 520 requests a list of packages from OSS/BSS GW 530. At 904, OSS/BSS GW 530 returns a list of packages which, for each package i n the list, may contain various combinations of one more of: Package Name; Package ID; Array of Service IDs; and Array of Package IDs for recursive package of packages. At 906 SDP 520 requests a list of services from OSS/BSS GW 530. At 908, OSS/BSS GW 530 returns a list of services which, for each service in the list, may contains various combinations of one or more of: Service Name; Service ID; Full Screen/PiP (defines whether service is provided as a full screen or Picture in Picture service); and Description.

At 910, based on information received from content providers, video operations unit 510 uses interface 522 to provision a blackout event. For each content provider, video operations unit 510 will enter into the user interface 522 of SDP 520 the corresponding blackout attributes. In some embodiments, these blackout attributes may include various combinations of one or more of: Blackout ID; Affected RC(s) (one or more geographic areas to which blackout should be applied); Primary Channel; Blackout Content From list of discovered service collection and services from IPTV by SDP; Blackout Type (standard or reverse blackout); Start Date/Time (In some embodiments, on-demand blackout event execution requires a 5-minute pad time); End Date/Time; Start Mode (manual or auto); End Mode (manual or auto); Alternate Channel and Content* From list of discovered service collection and services from IPTV by SDP; Alert and Alert Mechanism (e.g. pager, phone, email, instant message etc.).

Figure 10:
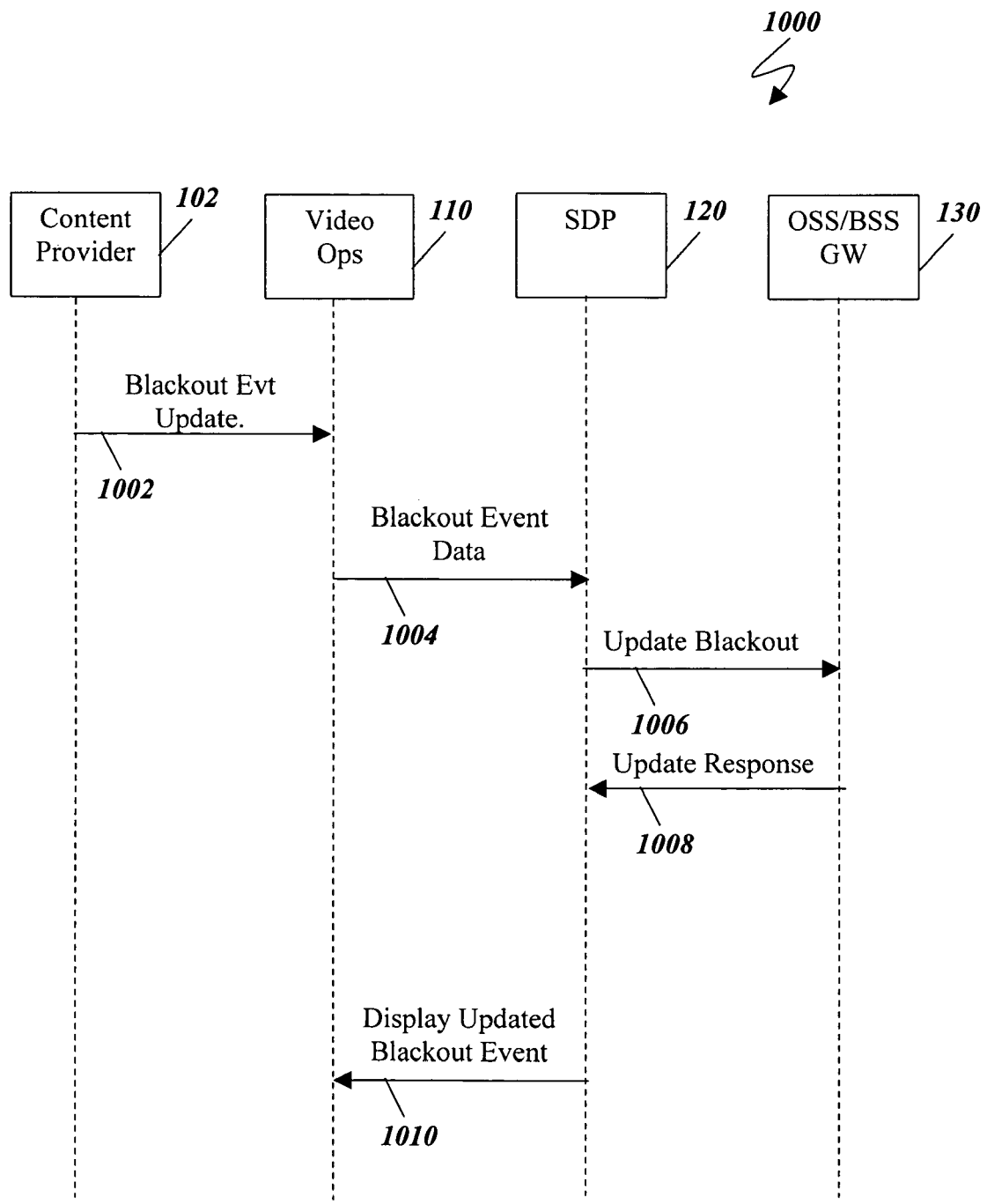
FIG. 10 is a sequence diagram for a method for updating a blackout schedule for geographically restricted content in accordance with an example embodiment.

At 912, SDP 520 for each content provider, SDP 520 creates a blackout event in IPTV with the following: Subscriber Group ID; External Blackout ID (human readable text identifying blackout event) Start Date/Time; End Date/Time; Primary Main and Primary PiP ID; Secondary Main and Secondary PiP ID; and Standard or Reverse Blackout. Referring to FIG. 10, a sequence diagram for a method 800 for updating a blackout schedule for geographically restricted content in accordance with an example embodiment is shown. The sequence begins at 1002 when video operations unit receives a request to update a blackout schedule for a content provider.

At 1004, for each content provider requesting an update, video operations unit 510 may retrieve or display previously scheduled blackout events with the following attributes to be updated: Blackout ID; Start Mode; Start Date/Time; End Mode; End Date/Time; and Alert Recipients. At 1006, SDP 520 may persist the Blackout Event updates. For each content provider, SDP may update the associated blackout event in IPTV with the following: External Blackout ID; Start Date/Time; End Date/Time; Primary Main and Primary PiP ID; and Secondary Main and Secondary Pip ID. At 1008, OSS/BSS GW 530 responds with an indication of whether or not the update was successful. At 1010, SDP 520 may display the results of the update.

Figure 11:
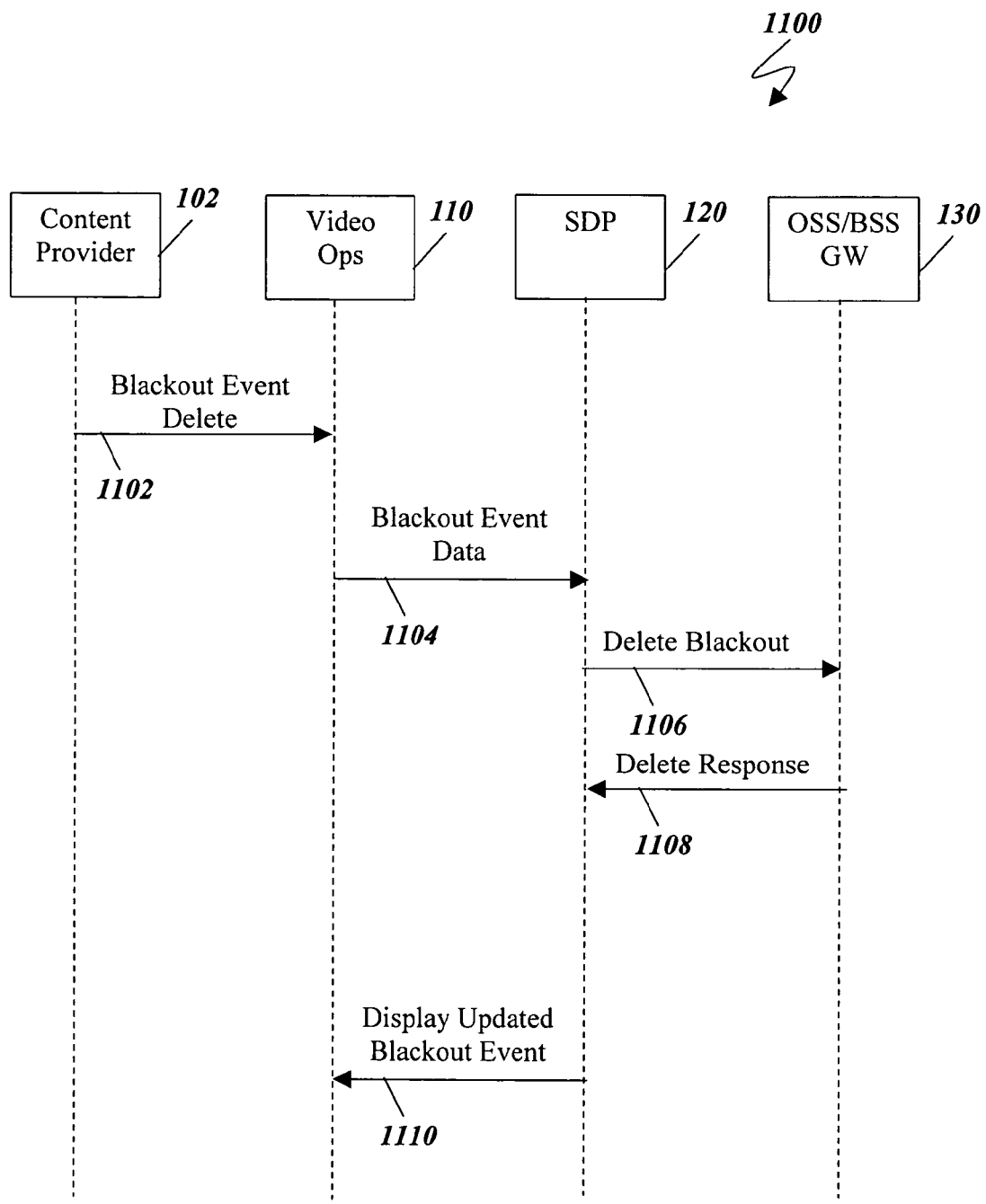
FIG. 11 is a sequence diagram for a method for deleting a blackout schedule for geographically restricted content in accordance with an example embodiment.

Referring to FIG. 11, a sequence diagram for a method 1100 for deleting a blackout schedule for geographically restricted content in accordance with an example embodiment is shown. The sequence begins at 1102 when video operations unit 510 receives a request to delete a blackout event for a content provider 502. At 1104, for each content provider requesting blackout event deletion, video operations unit 510 may retrieve data for the currently schedule event and issues a request to SDP 520 to delete the event. At 1106, SDP 520 requests deletion of the blackout event from OSS/BSS GW 530. The blackout event may be deleted according to the blackout ID associated with the event, or according to an external ID associated with the blackout event. At 1108, OSS/BSS GW 530 responds with an indication of whether or not the deletion was successful.

Figure 12:
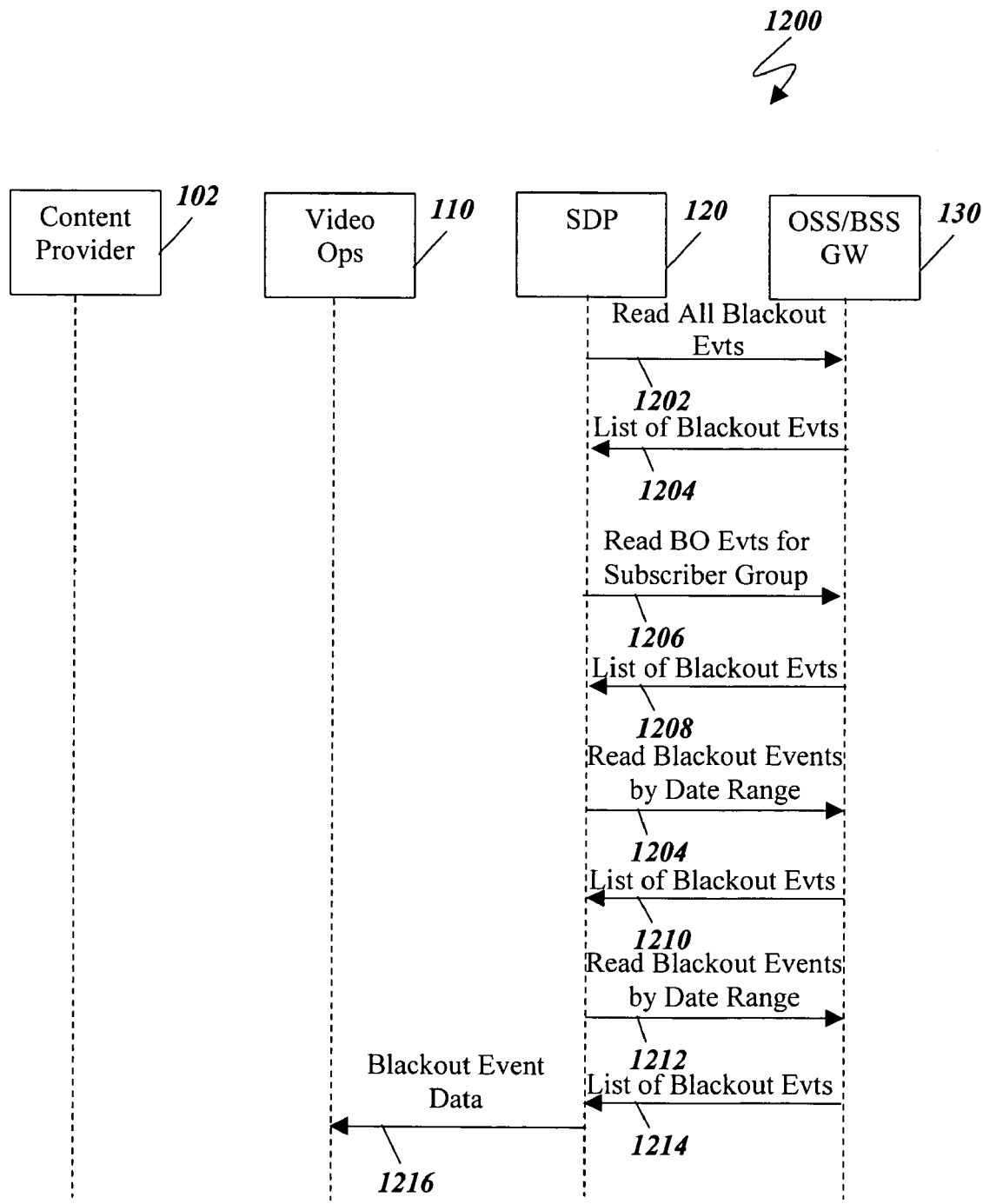
FIG. 12 is a sequence diagram for a method for verifying a blackout schedule for geographically restricted content in accordance with an example embodiment.

Referring to FIG. 12, a sequence diagram for a method 1200 for verifying a blackout schedule for geographically restricted content in accordance with an example embodiment is shown. In some embodiments, status of executed blackout events (either the execution of the start or the end) can be verified through the retrieval of the associated blackout event, which should have an updated start status and end status if the blackout event was executed successfully. At 1202, SDP 520 requests a list of blackout events. At 1004, OSS/BSS GW 530 responds with the requested list.

At 1206, SDP 520 requests a list of blackout events for a subscriber group. At 1208, OSS/BSS GW 530 responds with the requested list. At 1210, SDP 520 requests a list of blackout events for a given date range. At 1012, OSS/BSS GW 530 responds with the requested list. At 1214, SDP 520 requests a list of blackout events by subscriber group for a given data range. At 1216 OSS/BSS GW 530 responds with the requested list. It should be noted that any one of the requests events of 1202, 1206, 1210 or 1214 may be used to request blackout event data. At 1216, SDP 520 provides the blackout statuses to video operations unit 510.

Figure 13:
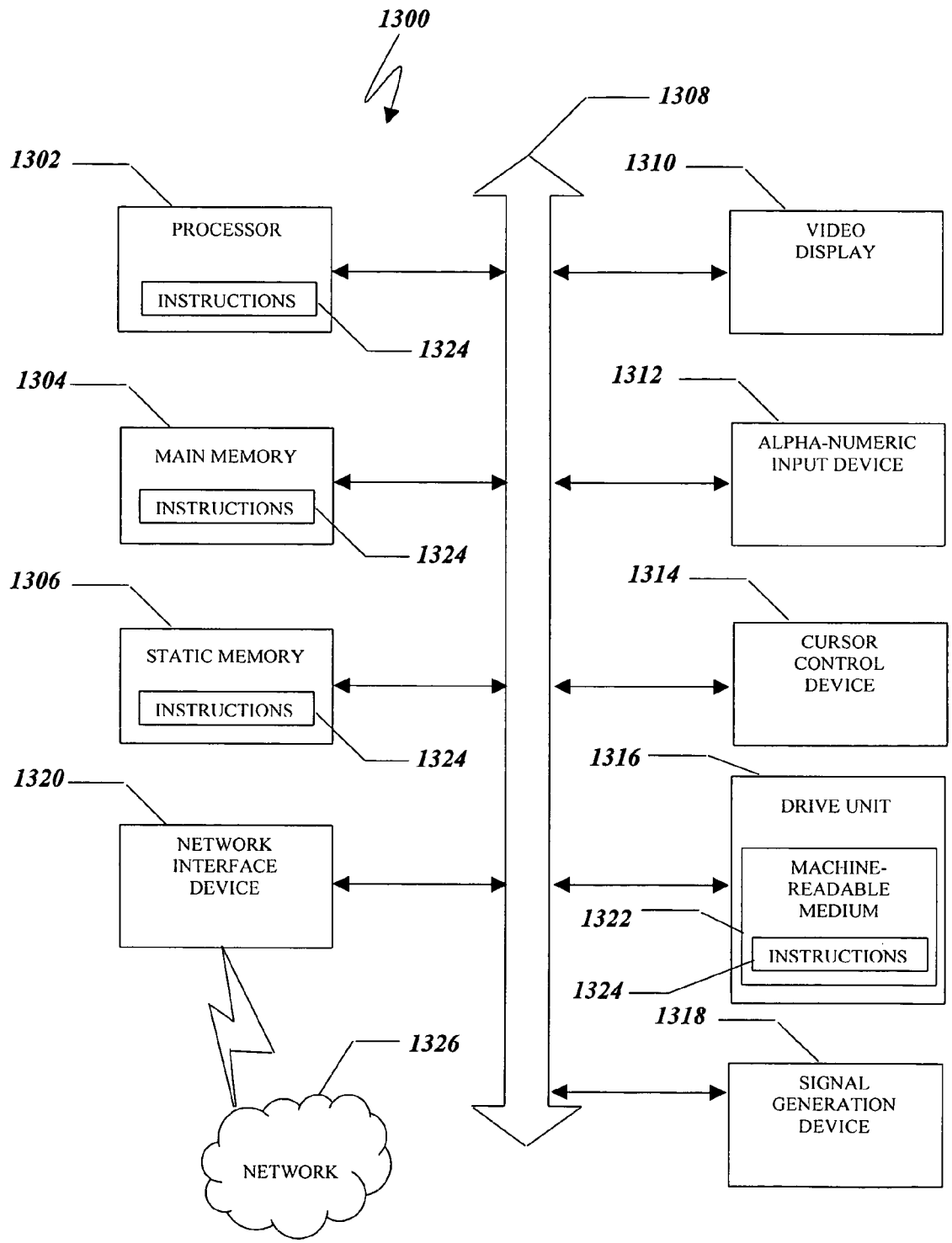
FIG. 13 is a diagrammatic representation of a machine in the form of a computer system within which a set of instructions, when executed, may cause the machine to perform any one or more of the methodologies of the illustrative embodiment.

Turning now to FIG. 13, FIG. 13 is a diagrammatic representation of a machine in the form of a computer system 1300 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1300 may include a processor 1302 (e.g., a central processing unit (CPU), a graphics processing unit (GPU), or both), a main memory 1304 and a static memory 1306, which communicate with each other via a bus 1308. The computer system 1300 may further include a video display unit 1310 (e.g., liquid crystals display (LCD), a flat panel, a solid state display, or a cathode ray tube (CRT)). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320.

The disk drive unit 1316 may include a machine-readable medium 1322 on which is stored one or more sets of instructions (e.g., software 1324) embodying any one or more of the methodologies or functions described herein, including those methods illustrated in herein above. The instructions 1324 may also reside, completely or at least partially, within the main memory 1304, the static memory 1306, and/or within the processor 1302 during execution thereof by the computer system 1300. The main memory 1304 and the processor 1302 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a machine readable medium containing instructions 1324, or that which receives and executes instructions 1324 from a propagated signal so that a device connected to a network environment 1326 can send or receive voice, video or data, and to communicate over the network 1326 using the instructions 1324. The instructions 1324 may further be transmitted or received over a network 1326 via the network interface device 1320.

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the illustrative embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the illustrative embodiment is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The invention claimed is:

1. A non-transitory computer readable medium containing a computer program comprising instructions that when executed by a computer to verify an occurrence of a blackout event in a data distribution system, the computer program comprising:
   instructions to receive restricted content data at the data distribution system;
   instructions to receive at the data distribution system, blackout event data indicating at least one event criterion data for selecting client devices subject to the blackout event for the restricted content data;
   instructions to place at the data distribution system, client devices into a client device group subject to the blackout event in accordance with the event criterion data;
   instructions to correlate at the data distribution system, the event criterion data with the restricted content data;
   instructions to generate at the data distribution system, at least one substitution event data table from the correlating for the client device group;
   instructions to send from the data distribution system, restricted content and the substitution event data embedded in the restricted content data to each client device in the client device group;
   instructions to receive at the data distribution system, retune activity data from at least one of the client devices in the client device group;
   instructions to correlate at the data distribution system, the blackout event data with the retune activity data to verify the occurrence of the blackout event in the client device; and
   instructions to compare time of day data for the retune activity data for the client devices in the client device group to time of day for the blackout event data to verify that the retune activity data coincides with the blackout event data.

2. The medium of claim 1, wherein the restricted data is restricted based on at least one criterion selected from the group consisting of geographic restriction criterion data and demographic restriction criterion data.

3. The medium of claim 1, wherein the restricted data is selected from the group consisting of video data and audio data.

4. The medium of claim 1, wherein the data distribution system is an internet protocol television system, wherein the instructions to verify further comprise instructions to verify the occurrence of the blackout event in an electronic data warehouse for the internet protocol television system.

5. The medium of claim 4, wherein the restricted data is received in a video operations system in the internet protocol television system, the substitution event data is generated in a provisioning system in the internet protocol television system and the retune data is received at the electronic data warehouse.

6. The medium of claim 1, wherein the blackout data indicates a retune location to which a client device retunes after initially tuning to a data feed containing the restricted data during the blackout event.

7. A system for verifying an occurrence of a blackout event in a data distribution system, the system comprising:
   a processor in data communication with a computer readable medium; and
   a computer program comprising instructions embedded in the computer readable medium, the computer program further comprising instructions to receive restricted content data at the data distribution system;
   instructions to receive at the data distribution system, blackout event data indicating at least one criterion for selecting client devices subject to a blackout event for the restricted content data; instructions to place at the data distribution system, client devices into a client device group subject to the blackout event in accordance with the event data criterion; instructions to correlate at the data distribution system, the event data with the restricted content data;
   instructions to generate at the data distribution system, at least one substitution event data table for the client device group;
   instructions to send from the data distribution system, restricted content and substitution event data embedded in the restricted content data to each client device in the client device group;
   instructions to receive at the data distribution system, retune activity data from at least one of the client devices in the client device group;
   instructions to correlate at the data distribution system, the blackout event data with the retune activity data to verify the occurrence of the blackout event in the client devices; and
   instructions to compare time of day data for the retune activity data for the client devices in the client device group to time of day for the blackout event data to verify that the retune activity data coincides with the blackout event data.

8. The system of claim 7, wherein the restricted data is restricted based on at least one of geographic restriction criterion data and demographic restriction criterion data.

9. The system of claim 7, wherein the restricted data is selected from the group consisting of video data and audio data.

10. The system of claim 7, wherein the data distribution system is an internet protocol television system, wherein the instructions to verify further comprise instructions to verify the occurrence of the blackout event in an electronic data warehouse for the internet protocol television system.

11. The system of claim 10, the system further comprising a video operations system having an interface to receive the restricted data in the internet protocol television system and a provisioning system in the internet protocol television system having an interface to receive the event data and blackout data and send retune data to client devices in the internet protocol television system and an electronic data warehouse having an interface to receive the electronic data warehouse.

12. The system of claim 7, wherein the blackout data indicates a retune location to which a client device retunes after initially tuning to a data feed containing the restricted data during the blackout event.

\* \* \* \* \*